(12) United States Patent  
Chen et al.

(10) Patent No.: US 8,836,609 B2
(45) Date of Patent: Sep. 16, 2014

(54) TIME TYPE STEREOSCOPIC DISPLAY DEVICE AND TIME TYPE STEREOSCOPIC IMAGE DISPLAYING METHOD

(75) Inventors: Chao-Yuan Chen, Hsin-Chu (TW); Geng-Yu Liu, Hsin-Chu (TW); Jenn-Jia Su, Hsin-Chu (TW); Ting-Jui Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 536 days.

(21) Appl. No.: 12/544,209

(22) Filed: Aug. 19, 2009

(65) Prior Publication Data

US 2010/0109979 A1  May 6, 2010

(30) Foreign Application Priority Data

Oct. 31, 2008  (TW) ................................ 97141975 A

(51) Int. Cl.
*G09G 5/00* (2006.01)
*H04N 13/04* (2006.01)
*G09G 3/00* (2006.01)
*G09G 3/36* (2006.01)

(52) U.S. Cl.
CPC ........... *G09G 3/001* (2013.01); *H04N 13/0434* (2013.01); *G09G 3/003* (2013.01); *H04N 13/0438* (2013.01); *G09G 3/3648* (2013.01); *H04N 13/0497* (2013.01); *G09G 2310/02* (2013.01); *G09G 2300/023* (2013.01)
USPC .............................................. 345/1.1; 345/7

(58) Field of Classification Search
USPC ................. 345/1.1–9, 32; 349/15; 348/42–48
See application file for complete search history.

(56) References Cited

U.S. PATENT DOCUMENTS

| 5,933,127 | A  | * | 8/1999  | DuBois ........................... 345/87 |
| 6,046,787 | A  | * | 4/2000  | Nishiguchi ................... 349/129 |
| 6,049,424 | A  | * | 4/2000  | Hamagishi ................... 359/464 |
| 6,181,303 | B1 |   | 1/2001  | Johnson |
| 6,246,451 | B1 | * | 6/2001  | Matsumura et al. ............ 349/15 |
| 7,821,583 | B2 | * | 10/2010 | Yeh et al. ......................... 349/15 |
| 2002/0145682 | A1 |   | 10/2002 | Kwon |
| 2004/0008156 | A1 |   | 1/2004  | Kuroda |
| 2005/0093815 | A1 | * | 5/2005  | Jen et al. ....................... 345/102 |
| 2005/0219357 | A1 |   | 10/2005 | Sun |
| 2006/0023143 | A1 | * | 2/2006  | Lee .............................. 349/102 |
| 2006/0203338 | A1 |   | 9/2006  | Pezzaniti |
| 2007/0035830 | A1 | * | 2/2007  | Matveev et al. .............. 359/464 |
| 2008/0084513 | A1 | * | 4/2008  | Brott et al. ...................... 349/15 |

* cited by examiner

*Primary Examiner* — Chanh Nguyen
*Assistant Examiner* — Ram Mistry
(74) *Attorney, Agent, or Firm* — Winston Hsu; Scott Margo

(57) ABSTRACT

A stereoscopic display device includes a display panel, and a light modulator. The display panel provides a first display information and a second display information alternately by scanning. The light modulator is disposed on the side of a display surface of the display panel and receives the first display information and the second display information. The light modulator provides a first modulating mode and a second modulating mode alternately by scanning synchronously with the display panel. The first modulating mode corresponds to the first display information, and renders the first display information having a first polarization state; the second modulating mode corresponds to the second display information, and renders the second display information having a second polarization state.

18 Claims, 8 Drawing Sheets

TIME TYPE STEREOSCOPIC DISPLAY DEVICE AND TIME TYPE STEREOSCOPIC IMAGE DISPLAYING METHOD

BACKGROUND OF THE INVENTION

1. Field of the Invention

The present invention relates to a stereoscopic display device and an image displaying method thereof, more particularly, to a stereoscopic display device using a pair of polarizer glasses to obtain a stereoscopic image and the displaying method thereof.

2. Description of the Prior Art

By providing a vivid stereoscopic image for the observer, the stereoscopic display technology has become one of the major developing directions of modern displaying technologies. Please refer to FIG. 1 and FIG. 2. FIG. 1 is a schematic diagram of a conventional shutter-glasses-type stereoscopic display device, and FIG. 2 is an operating schematic diagram of a conventional shutter-glasses-type stereoscopic display device. As shown in FIG. 1, the shutter-glasses-type stereoscopic display device 1 comprises a display panel 10 and a pair of shutter glasses 12. When displaying images, the display panel 10 provides a left eye image 16 for the left eye and a right eye image 14 for the right eye alternately by scanning. When watching the displaying images, the shutter glasses 12 worn by the observer allows the target eye to catch the images from the display panel 10 and blocks the non-target eye to catch the images based on what is shown on the display panel 10. As shown in FIG. 2, the display panel 10 shows a flow chain of a complete frame according to the direction of the circular arrow. The detail of the flow chain is described below:

Time t1: The display panel 10 shows a complete right eye image 14, and all regions of the display panel 10 show the information for the right eye. At this time, the shutter glasses 12 will block the sight of the observer's left eye to make it not see the right eye image 14 displayed by the display panel 10, but allow the observer's right eye to see the right eye image 14 displayed by the display panel 10.

Time t2: Start to scan the left eye image 16. At this time, a small region of the display panel 10 shows the left eye image 16 but most of the regions remain the right eye image 14. The shutter glasses 12 still blocks the sight of the observer's left eye to make it not see the right eye image 14 displayed by the display panel 10, but allows the observer's right eye to see the right eye image 14. Since the right eye information shown by the display panel 10 is still much greater than the left eye information, so a small portion of the left image 16 will not affect too much. In order to reduce the disturbance from the left eye image 16 to the right eye, the right eye light transmission rate could be turned down, so the brightness of the left-eye image 16 captured by the observer will be lowered so as to reduce the disturbance from the left eye image 16 to the right eye.

Time t3: Keep scanning the left eye image 16. At this time more regions of the display panel 10 have shown the left eye image 16, causing an area of the left eye information similar to an area of the right eye information. In order to avoid interference, the shutter glasses 12 will block both the sight of the left eye and the right eye to prevent the observer receiving the mixed information.

Time t4: Keep scanning the left eye image 16. At this time most regions of the display panel 10 have shown the left eye image 16 but only a small region remain the right eye image 14. At this time the shutter glasses 12 will block the sight of the observer's right eye, but allow the observer's left eye to see the left eye image 16. Since the left eye information shown by the display panel 10 is already much greater than the right eye information, so a small portion of the right image 14 will not affect too much. In order to reduce the disturbance from the right eye image 14 to the left eye, the left eye light transmission rate could be turned down, so the brightness of the right eye image 14 captured by the observer will be lowered so as to reduce the disturbance from the right eye image 14 to the right eye.

Time t5: The display panel 10 shows a complete left eye image 16, and all regions of the display panel 10 show the information for the left eye. At this time, the shutter glasses 12 will block the sight of the observer's right eye to make it not see the left eye image 16 displayed by the display panel 10, but allow the observer's left eye to see the left eye image 16 displayed by the display panel 10.

At time t6, t7, t8, the display panel 10 will scan in accordance with the above-mentioned manner, beginning in scanning the right eye image 14, gradually transforming from the left eye image 16 to the right eye image 14, and the shutter glasses 12 will make the corresponding change, until the display panel 10 again shows the complete right eye image 14 at time t1.

From the above, we can see that in order to maintain the stereoscopic effect, images that contain both the left eye information and the right eye information that have no obvious difference must be partially discarded (e.g. the image at time t3 and time t7 in FIG. 2), or the observer will be perceptually confused when his left eye and right eye receive this image at one time. However, as part of the images can not be used, making the brightness and the frame rate of the conventional shutter-glasses-type stereoscopic display device 1 decreased and therefore lowing the display quality.

In addition, conventional technology further contains a space-type stereoscopic technology, which is accomplished when the display panel shows two sets of images for the left eye and the right eye respectively, making the observer's left eye only receive the left eye image, the right eye only receive the right eye image. However, because the display panel should show two sets of image at one time, in some cases the resolution will drop to 50%, causing the disadvantage of low-resolution.

SUMMARY OF THE INVENTION

It is therefore one of the objects of the present invention is to provide a stereoscopic display device to improve its frame rate and brightness.

To achieve the above purpose, a stereoscopic display device is provided in the present invention. The stereoscopic display device comprises a display panel and a light modulation device. The display panel provides a first display information and a second display information alternately by scanning. The light modulation device is disposed on the side of a display surface of the display panel and receives the first display information and the second display information. The light modulation device provides a first modulating mode and a second modulating mode alternately by scanning synchronously with the display panel. The first modulating mode corresponds to the first display information, and renders the first display information having a first polarization state; the second modulating mode corresponds to the second display information, and renders the second display information having a second polarization state.

To achieve the above purpose, a method of displaying a stereoscopic image is provided. The method comprises the following steps of: using a display panel to provide a first display information and a second display information alternately by scanning; providing a light modulation device for receiving the first display information and the second display information from the display panel, in which the light modulation device provides a first modulating mode and a second modulating mode alternately by scanning synchronously with the display panel, wherein the first modulating mode corresponds to the first display information and renders the first display information having a first polarization state, and the second modulating mode corresponds to the second display information and renders the second display information having a second polarization state.

With the light modulation device that is scanning synchronously with the display panel, the stereoscopic display device in the present invention can obtain the effect of stereoscopic display and have the advantages of higher frame rate, higher brightness, lower cost and more convenience.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be made in details. The preferred embodiments of the present invention are illustrated in the accompanying drawings with numbered elements.

Figure 1:
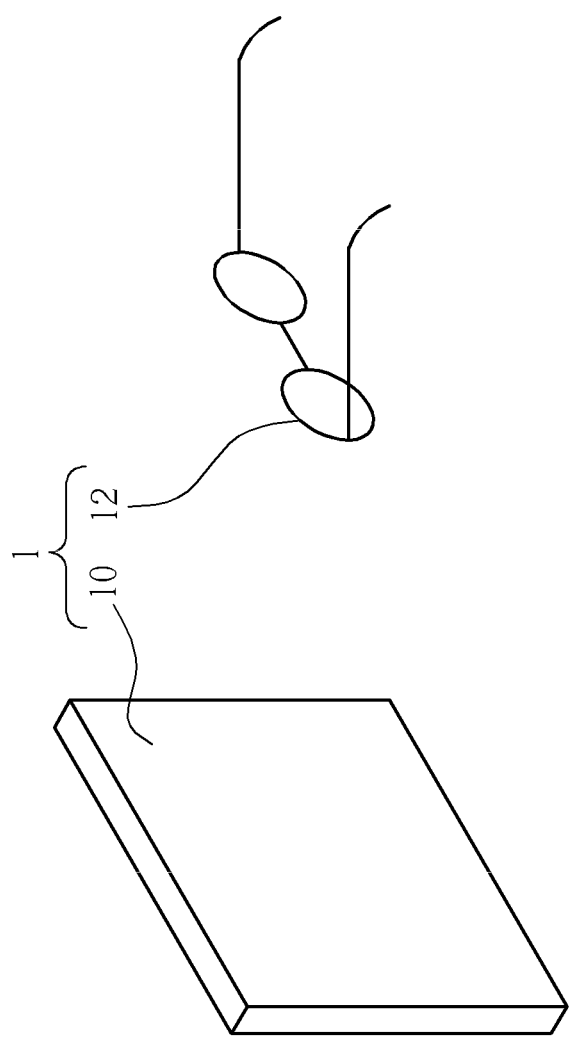
FIG. 1 is a schematic diagram of a conventional shutter-glasses-type stereoscopic display device.
Figure 2:
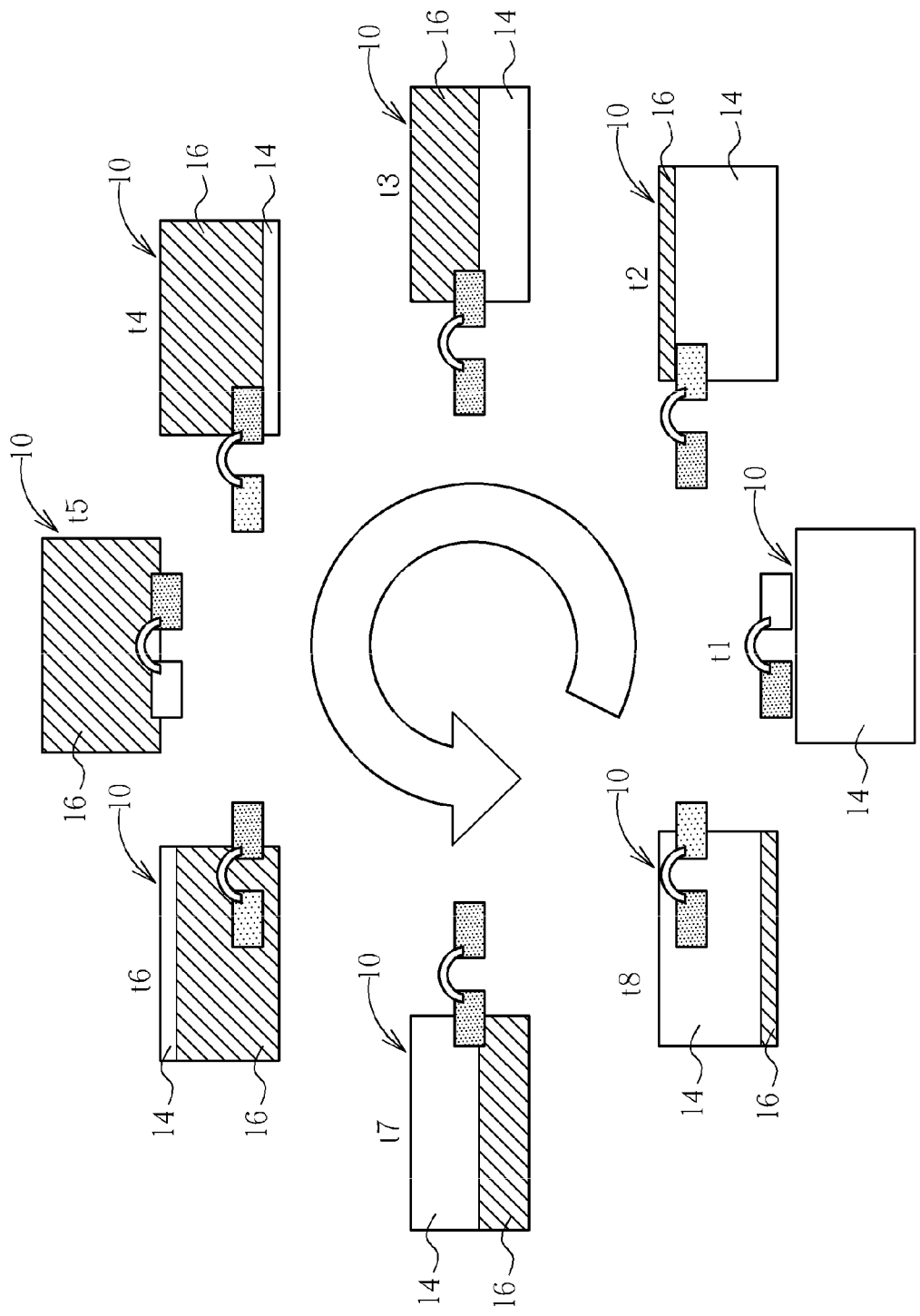
FIG. 2 is an operating schematic diagram of a conventional shutter-glasses-type stereoscopic display device.
Figure 3:
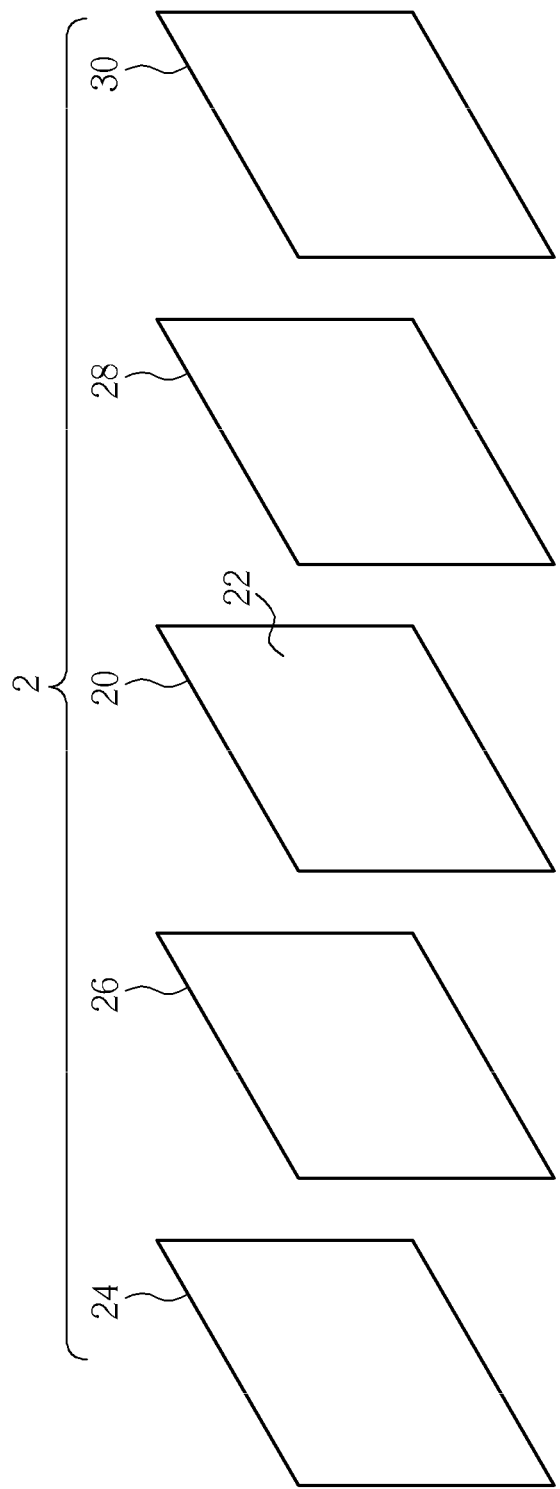
FIG. 3 is a schematic diagram of one of the preferred embodiment of the stereoscopic display device in the present invention.

Please refer to FIG. 3. FIG. 3 is a schematic diagram of one of the preferred embodiment of the stereoscopic display device in the present invention. As shown in FIG. 3, the stereoscopic display device 2 comprises a display panel 20 and a light modulation device 30. The display panel 20 comprises a display surface 22 and the light modulation device 30 is disposed on the side of the display surface 22 of the display panel 20. In this embodiment, the display panel 20 is an LCD panel, so the stereoscopic display device 2 further comprises a backlight module 24 to provide light source for the display panel 20, wherein the backlight module 24 is disposed on the other side of the display panel 20 opposite the light modulation device 30. The backlight module 24 can be a permanently-on backlight module or a scanning backlight module. The display panel 20 further comprises a first polarization film 26 disposed between the display panel 20 and the backlight module 24, and a second polarization film 28 disposed between the display panel 20 and the light modulation device 30, wherein the polarization direction of the first polarization film 26 and the second polarization film 28 can be orthogonal or parallel according to different kinds of LCD display modes. The display panel 20 of the present invention is not limited to a LCD panel, but could be any kinds of display panels that update image by scanning, such as a plasma display panel, an electroluminescence panel or a cathode ray tube display panel. In other words, the display panel 20 is constituted by a pair of corresponding transparent substrates (not shown) and a display medium (not shown) disposed between the corresponding transparent substrates (not shown). An active layer is disposed on the surface of one of the corresponding transparent substrates, wherein the active layer comprises pixel regions arranged in matrix array, each of which comprises a thin film transistor, a signal line electrically coupled to the thin film transistor and a pixel electrode. The display medium comprises liquid crystal molecules or other suitable materials. A covering layer is disposed the surface of the other one of the corresponding transparent substrates, wherein the covering layer comprises a color filter layer, a transparent electrode layer, other suitable materials or a stacked layer with at least two materials mentioned above.

The display panel 20 is connected to an image processor (not shown) which send out a first image signal (for example, a left eye image) and a second image signal (for example, a right eye image) in series. According to the first image signal and the second image signal, the display panel 20 provides a first display information (for example, a left eye display information) and a second display information (for example, a right eye display information) alternately by scanning.

Figure 4:
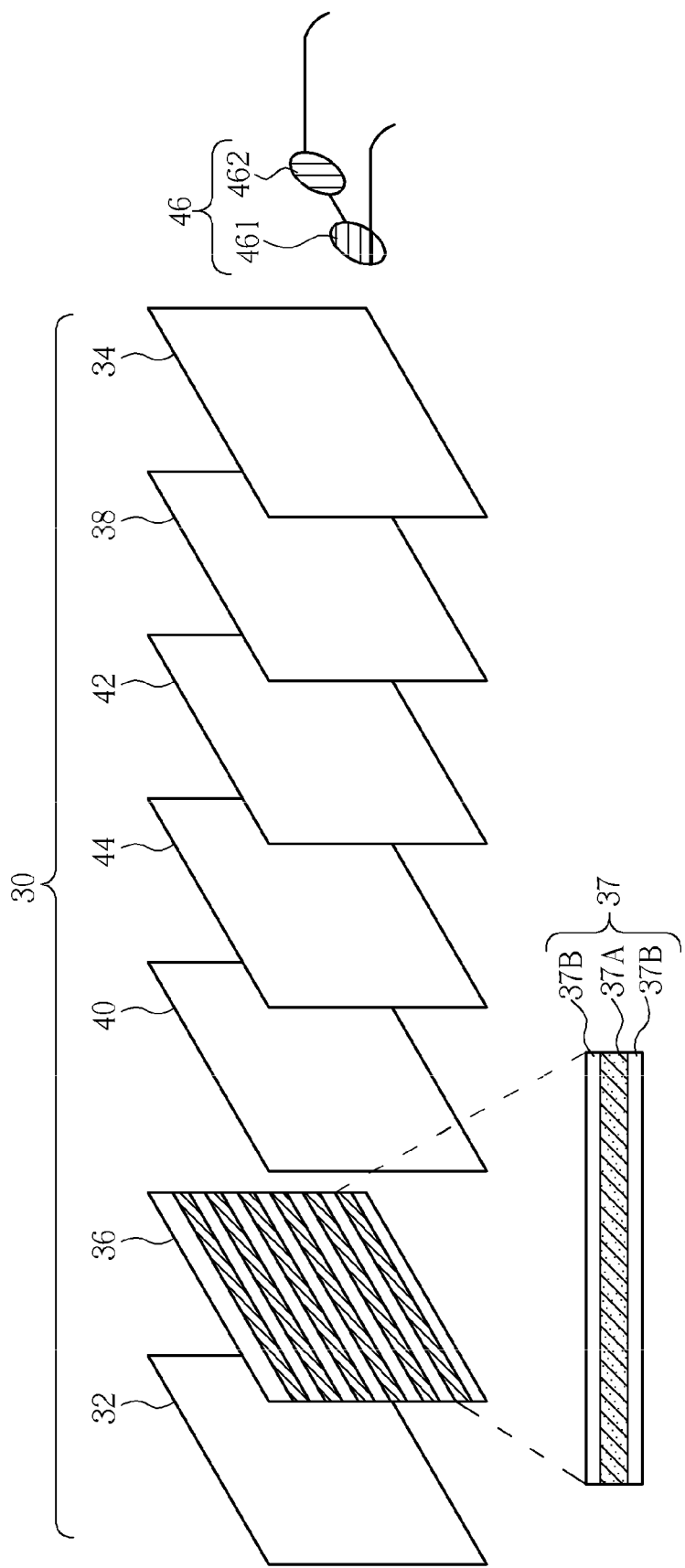
FIG. 4 is an exploded schematic diagram of the light modulation device in the present invention.
Figure 5:
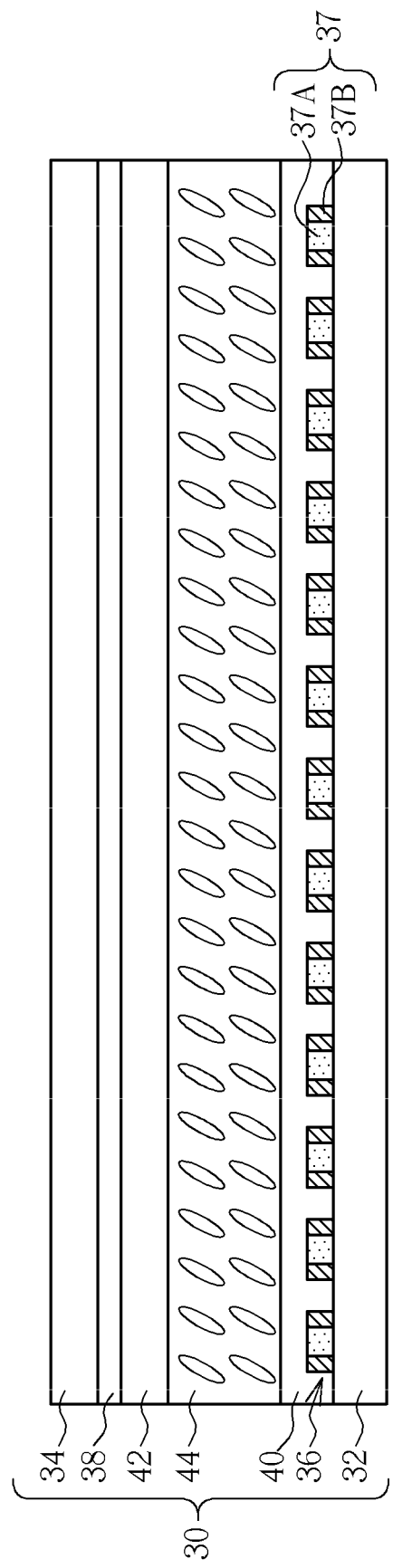
FIG. 5 is a sectional schematic diagram of the light modulation device.

Please refer to FIG. 4 and FIG. 5 in conjunction with FIG. 3. FIG. 4 is an exploded schematic diagram of the light modulation device in the present invention and FIG. 5 is a cross-sectional schematic diagram of the light modulation device. As shown in FIG. 4 and FIG. 5, the light modulation device 30 in this embodiment is a liquid crystal type light modulation device that comprises a first transparent substrate 32, a second transparent substrate 34, a modulating electrode pattern 36, a transparent common electrode 38, a first alignment film 40, a second alignment film 42 and a liquid crystal layer 44. The first transparent substrate 32 and the second transparent substrate 34 are disposed opposite to each other where a gap exists therebetween. The first transparent substrate 32 and the second transparent substrate 34 include thin film material. For example, the first transparent substrate 32 and the second transparent substrate 34 can be made of rigid transparent materials, but also can made of other soft or flexible materials such as glass, quartz or plastics. In addition, the first transparent substrate 32 or the second transparent substrate 34 of the light modulation device 30 can be integrated with the transparent substrate of the display panel 20, that is, the light modulation device 30 share at least one transparent substrate with the display panel 20. However, in order to keep the normal display function of the display panel 20, the second polarization film 28 is needed. Taking the example of integrating the first transparent substrate 32 of the light modulation device 30 into the transparent substrate of the display panel 20: when the light modulation device 30 is disposed on the second polarization film 28 of the display panel 20, the second polarization film 28 can be disposed on the inner side of the one of transparent substrate of the display panel 20 which is adjacent to the modulating electrode pattern 36 of the light modulation device 30. Thus, there is no polarization film on the outer side of one of the substrate of the display panel 20. At this point, the other components of the light modulation device 30 (such as the modulating electrode pattern 36) are set in order, and the display panel 20 and the light modulation device 30 share the first transparent substrate 32 or one of the substrates of the display panel 20. In other words, the display panel 20 and the light modulation device 30 originally require four transparent substrates, but in this situation, only three transparent substrates are required. In addition, the second polarization film 28 can also be set on the outer side of the one of transparent substrate of the display panel 20 which is adjacent to the modulating electrode pattern 36 of the light modulation device 30, as in the original position shown in FIG. 3. At this point the second polarization film 28 acts as the substrate of the light modulation device 30, such that the first transparent substrate 32 of the light modulation device 30 is omitted. In other words, the display panel 20 and the light modulation device 30 originally require four transparent substrates, but in this situation, only three transparent substrates are required. To enhance the protection of the second polarization film 28, it is preferable to form a protecting layer (not shown) on the second polarization film 28, then other components like the modulating electrode pattern 36 of the light modulation device 30 are therefore formed in series. Besides, the protecting layer (not shown) can also help the modulating electrode pattern 36 to attach onto the protecting layer (not shown). In terms of integrating the second transparent substrate 34 into the transparent substrate of the display panel 20, the sequence of each component is reverse from the sequence when integrating the first transparent substrate 32 of the light modulation device 30 into the transparent substrate of the display panel 20, which is not redundantly described herein. It is noted that the first polarization film 26 or the second polarization film 28 of the panel 20 can not be disposed on the second transparent substrate 34. Because, after passing through the modulating electrode pattern 36 of the light modulation device 30 the polarization direction and the information for two eyes are decided, which no longer can be changed by the first polarization film 26 or the second polarization film 28, otherwise, the device only can display a 2D image rather than a 3D image. The modulating electrode pattern 36 is disposed on the surface of the first transparent substrate 32 that faces the second transparent substrate 34, and the modulating electrode pattern 36 comprises a plurality of stripe electrodes 37 that are parallel to each other. The plurality of stripe electrodes 37 are corresponding to each of the scan lines of the display panel 20 to make the light modulation device 30 scan synchronously with the display panel 20. The plurality of strip electrodes comprise a plurality of transparent electrodes 37A to drive the liquid crystal layer 44 and, in order to increase electric conductivity but not affect the light transmittance, a plurality of auxiliary electrodes 37B, for example metal electrodes, is selectively formed besides the transparent electrodes 37A and electrically connected to each of the transparent electrode 37A individually. The transparent common electrode 38 is disposed on a surface of the second transparent substrate 34 that faces the first transparent substrate 32 to drive the liquid crystal layer 44 together with the modulating electrode pattern 36. The first alignment film 40 is disposed on the side of the first transparent substrate 32 that faces the second transparent substrate 34 and the second alignment film 42 is disposed on the side of the second transparent substrate 34 that faces the first transparent substrate 32 to align the liquid crystal molecules in the liquid crystal layer 44. The liquid crystal layer 44 is disposed between the first alignment film 40 of the first transparent substrate 32 and the second alignment film 42 of the second transparent substrate 34. In this embodiment, the liquid crystal molecules in the liquid crystal layer 44 are twisted nematic liquid crystal molecules, but are not be limited thereto.

The display panel 20 of the present invention can provide a first display information and a second display information alternately by scanning. Because the first display information and the second display information will pass through the second polarization film 28 of the display panel 20, the polarization state of the first display information and the second display information will be parallel to the penetrating axis of the second polarization film 28, becoming a linear polarization state. The light passing through the second polarization film 28 is defined to be in a second linear polarization condition hereafter, such as an S polarized light. The light modulation device 30 disposed on the side of the display surface 22 of the display panel 20 can receive the first display information and the second display information from the display panel 20 and provide a first modulating mode and a second modulating mode alternately by scanning synchronously with the display panel 20, wherein the first modulating mode corresponds to the first display information and renders the first display information having a first polarization state, and the second modulating mode corresponds to the second display information and renders the second display information having a second polarization state. In other words, when the first display information and the second display information are displayed at different positions on the display panel 20 by scanning, the first modulating mode and the second modulating mode are not maintained at a fixed position, but scanning synchronously with the display panel 20 to make the first modulating mode always correspond to the position of the first display information, and to make the second modulating mode always correspond to the position of the second display information. In this embodiment, the first modulating mode of the light modulation device 30 is a one-half wavelength retardation mode, and the second modulating mode is a zero wavelength retardation mode. In the one-half wavelength retardation mode, a driving voltage is applied to each of the corresponding stripe electrodes 37 by the light modulation device 30 in a scanning manner, thereby driving the liquid crystal layer 44 corresponded to the stripe electrodes 37. At this time, for the first display information passing through the light modulation device 30, the liquid crystal molecules in the liquid crystal layer 44 can play a role as a one-half wavelength retardation film, and therefore the polarization state of the first display information will be converted to the first linear polarization state that is orthogonal to the second linear polarization state, for example, from an S polarized light to a P polarized light. Besides, in the zero wavelength retardation mode, the driving voltage applied to each of the corresponding stripe electrodes 37 is stopped by the light modulation device 30 in a scanning manner, thereby not driving the corresponding liquid crystal layer 44. At this time, for the second display information passing through the light modulation device 30, the liquid crystal molecules in the liquid crystal layer 44 do not function in wavelength retardation and can be regarded as a zero wavelength retardation film, therefore, the polarization state of the second display information will not be changed and remained in the second linear polarization state, such as an S polarized light.

Furthermore, the stereoscopic display device 2 of the present invention further comprises a pair of polarizer glasses 46 and the observer should wear the polarizer glasses 46 when viewing the stereoscopic display device 2, so as to enable the right eye and the left eye catch the first display information and the second information respectively in order to achieve the effect of stereoscopic display. The polarizer glasses 46 comprises a first polarization lens and a second polarization lens and in this embodiment the first polarization lens is a first linear polarization lens 461 and the second polarization lens is a second linear polarization lens 462. The first linear polarization lens 461 allows transmission of the first display information in the first polarization state and blocks transmission of the second display information in the second polarization state, and the second linear polarization lens 462 allows transmission of the second display information in the second polarization state and blocks transmission of the first display information in the first polarization state.

Figure 6:
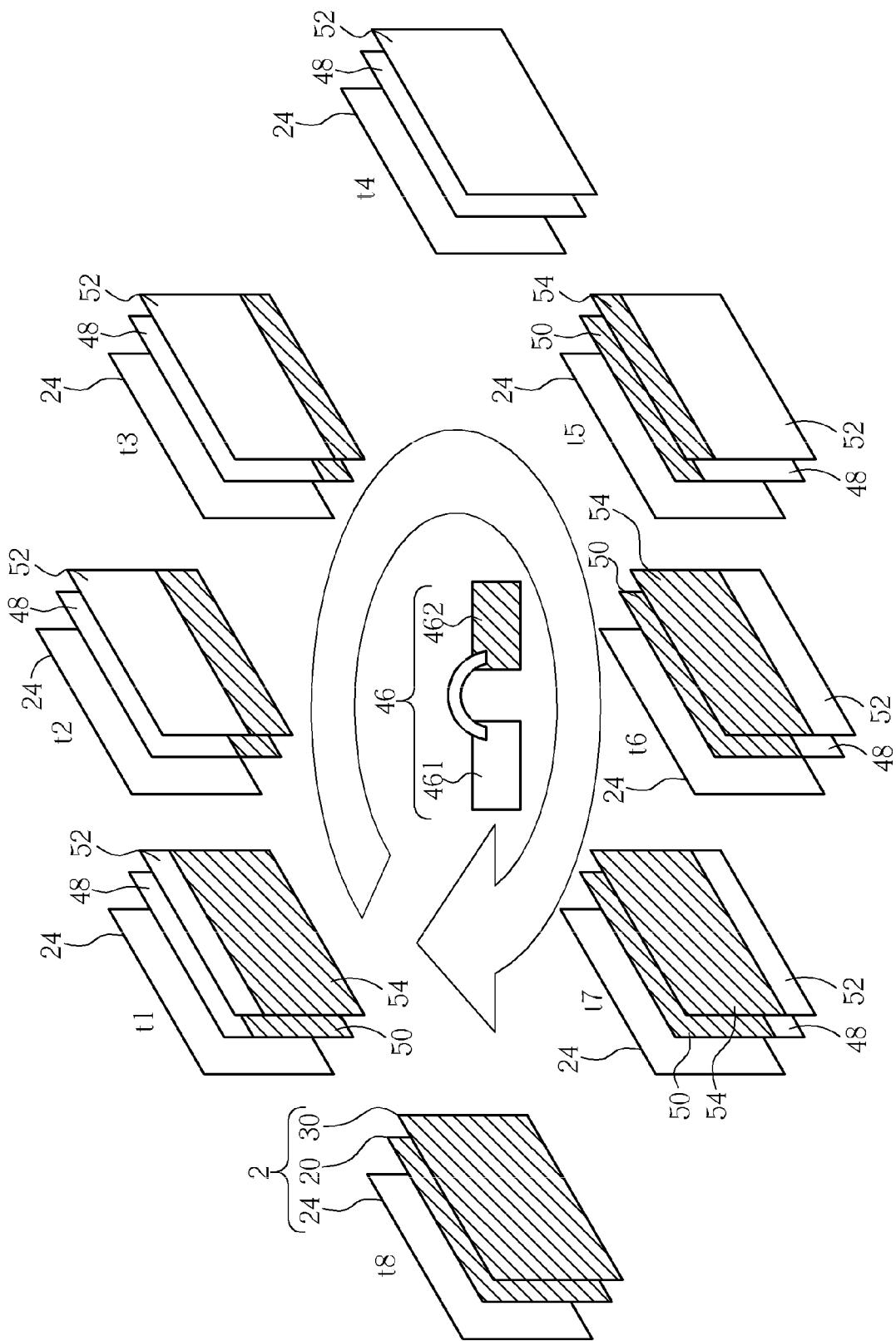
FIG. 6 is an operating schematic diagram of the stereoscopic display device in the present invention.

Please refer to FIG. 6. FIG. 6 is an operating schematic diagram of the stereoscopic display device 2 in the present invention. As shown in FIG. 6, the display panel 20 shows the flow chain of a complete frame according to the direction of the circular arrow, wherein the complete frame comprises a first display information (the left eye image) frame and a second display information (the right eye image) frame. The upper part of FIG. 6 illustrates the sequence from time t1 to t4. The display panel 20 starts in a progressive manner to display the left eye image 48 by scanning. The light modulation device 30 scan synchronously with the display panel 20, therefore, the first modulating mode 52 of the light modulation device 30 always corresponds to the left eye image 48 and the second modulating mode 54 always corresponds to the right eye image 50. By synchronous scanning, the polarization state of the left eye image 48 is always in the first linear polarization mode and can pass through only the first polarization lens 461 of the polarizer glasses 46 to arrive the observer's left eye. Likewise, the un-updated right eye image 50 on the display panel 20 is always in the second linear polarization mode and can pass through only the second polarization lens 462 of the polarizer glass 46 to arrive the observer's right eye.

The lower part of FIG. 6 illustrates the sequence from time t5 to t8. The display panel 20 starts in a progressive manner to display the right eye image 50 by scanning and the light modulation device 30 scan synchronously with the display panel 20 to make the second modulating mode 54 of the light modulation device 30 always correspond to the right eye image 50 and the first modulating mode 52 always correspond to the left eye image 48. By synchronous scanning, the polarization state of the right eye image 50 is always in the second linear polarization mode and can pass through only the second polarization lens 462 of the polarizer glass 46 to arrive the observer's right eye. Likewise, the un-updated left eye image 48 on the display panel 20 is always in the first linear polarization mode and can pass through only the first polarization lens 461 of the polarizer glass 46 to arrive the observer's left eye.

Figure 7:
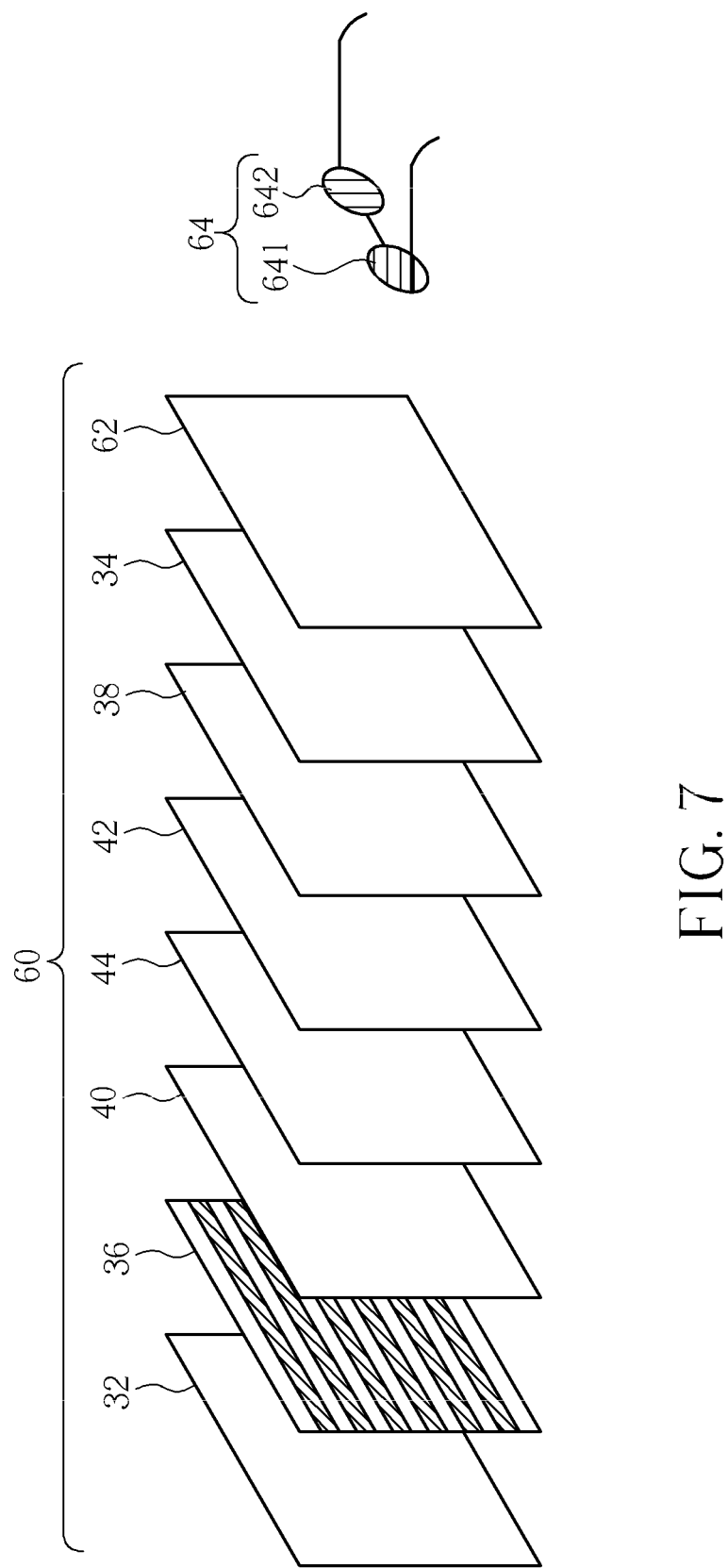
FIG. 7 is an exploded schematic diagram of the light modulation device in another embodiment.

Please refer to FIG. 7 in conjunction of FIG. 3. FIG. 7 is an exploded schematic diagram of a light modulation device 60 in another embodiment. To simplify the description and compare the similarities and differences between this and the foregoing embodiment, the following context only describes the different parts, no longer showing the similar parts and using the same reference numeral to label the same component. As shown in FIG. 7, the different part from the foregoing embodiment lies in, the light modulation device 60 in this embodiment further comprises a one-quarter wavelength retardation film 62, which is disposed on the side of the second transparent substrate 34 opposite the first transparent substrate 32. In another embodiment, the one-quarter wavelength retardation film 62 can be disposed between the transparent common electrode 38 and the second transparent substrate 34. FIG. 7 only shows one situation and should not be limited therein. The one-quarter wavelength retardation film 62 functions by its one-quarter wavelength retardation effect that can further convert the first display information in the first linear polarization state and the second display information in the second linear polarization state to polarized light in a first circular polarization state and in a second circular polarization state respectively, which are orthogonal to each other, for example, a left circular polarized light and a right circular polarized light.

In this embodiment, the stereoscopic display device 2 needs a pair of polarized glasses 64 that can filter a circular polarized light. The polarizer glasses 64 comprises a first circular polarization lens 641 and a second polarization lens 642. The first circular polarization lens 641 allows transmission of the first display information in the first circular polarization state and blocks transmission of the second display information in the second circular polarization state, and the second circular polarization lens 642 allows transmission of the second display information in the second circular polarization state and blocks transmission of the first display information in the first circular polarization state.

Figure 8:
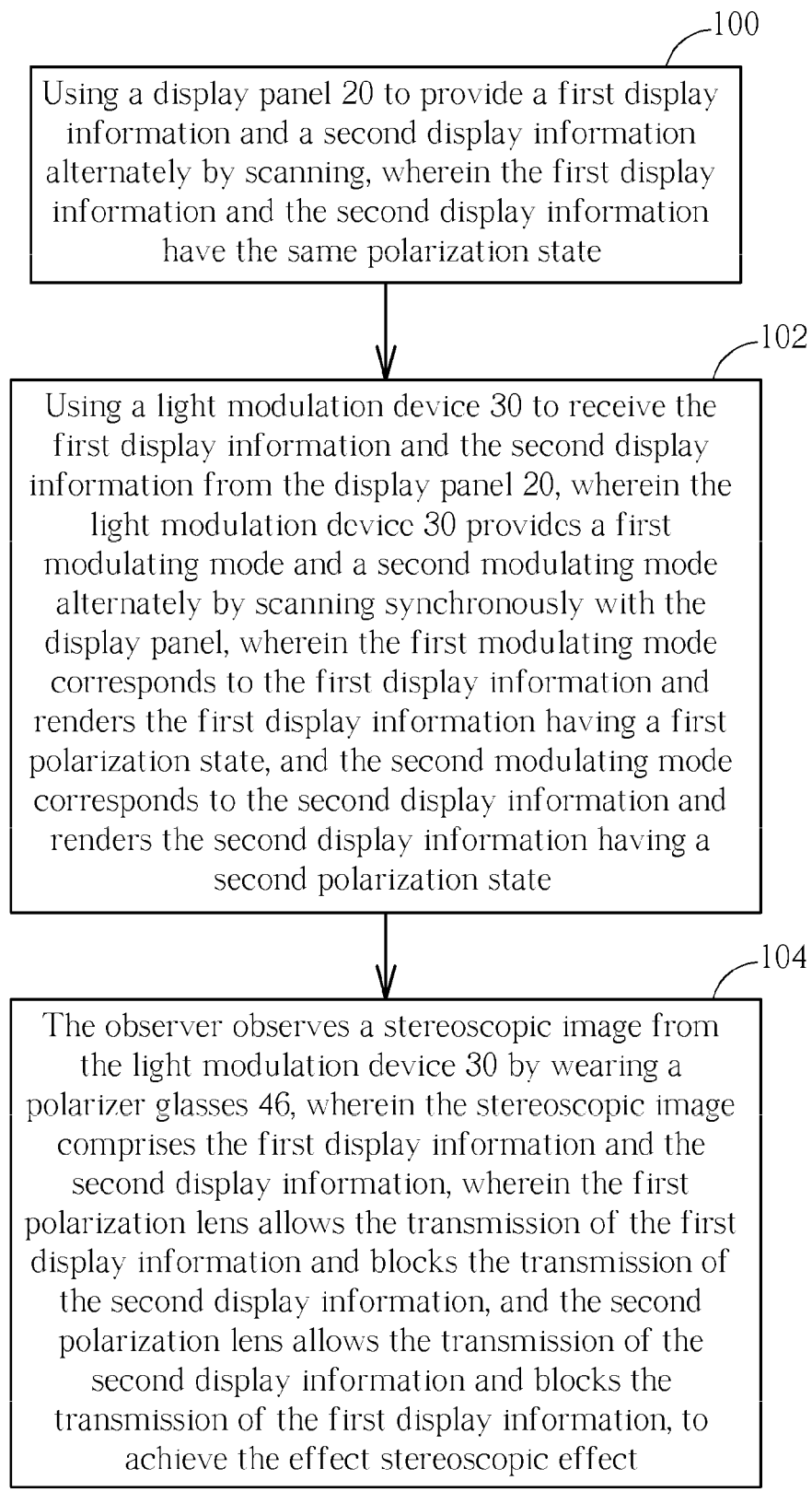
FIG. 8 is a flow chart of the method of displaying a stereoscopic image in the present invention.

Please refer to FIG. 8 in conjunction of FIG. 2 through FIG. 7. FIG. 8 is a flow chart of the method of displaying a stereoscopic image in the present invention. As shown in FIG. 8, the method of displaying a stereoscopic image comprises:

Step 100: Using a display panel 20 to provide a first display information and a second display information alternately by scanning, wherein the first display information and the second display information have the same orthogonal state;

Step 102: Using a light modulation device 30 to receive the first display information and the second display information from the display panel 20, wherein the light modulation device 30 provides a first modulating mode and a second modulating mode alternately by scanning synchronously with the display panel, wherein the first modulating mode corresponds to the first display information and renders the first display information having a first polarization state, and the second modulating mode corresponds to the second display information and renders the second display information having a second polarization state; and Step 104: The observer observes a stereoscopic image from the light modulation device 30 by wearing a polarizer glasses 46, wherein the stereoscopic image comprises the first display information and the second display information, wherein the first polarization lens allows the transmission of the first display information and blocks the transmission of the second display information, and the second polarization lens allows the transmission of the second display information and blocks the transmission of the first display information, to achieve the effect stereoscopic effect.

The present invention uses synchronous scanning of the light modulation device 30 and the display panel 20 to provide the first modulating mode and the second modulating mode alternately, wherein the first modulating mode renders the first display information having the first polarization state, and the second modulating mode renders the second display information having the second polarization state. The modulation could be achieved not limited to the one-quarter wavelength retardation and the one-half wavelength retardation. One focus of the present invention is to convert the first display information in the first linear polarization state and the second display information in the second linear polarization state respectively to light beams with orthogonally polarized directions, for example, a left circular polarized light and a right circular polarized light, or an S polarized light and a P polarized light, which should not be limited thereto.

As a result, the stereoscopic display device in the present invention uses a time-type stereoscopic technology which is characterized by using a display panel to provide a left eye image and a right eye image alternately by scanning at different time point, and with a light modulation device which is scanning synchronously with the display panel, keeping the left eye image and the right eye image in different polarization state, and a stereoscopic image is obtained by wearing a polarized glasses. With comparison to conventional stereoscopic display device, the present invention does not use a space-type stereoscopic technology, so it needs not to display the left eye image and the right eye image at the same time which will decrease its resolution. As a result, the present invention uses a light modulation device, coupled with a lower cost, light and convenient polarizer glasses, making it easy obtain the effect of stereoscopic display, instead of using an expensive shutter glasses and being obligatory to abandon a portion of frames in conventional technology. The stereoscopic display device therefore has the advantages of higher frame rate, higher brightness and lower cost.

Those skilled in the art will readily observe that numerous modifications and alterations of the device and method may be made while retaining the teachings of the invention.

What is claimed is:

1. A stereoscopic display device, comprising:
    a display panel comprising a display surface, wherein the display panel provides a first display information and a second display information alternately by scanning, and the display panel alternately scans the first display information for a left eye and the second display information for a right eye; and
    a light modulation device disposed on the side of the display surface of the display panel for receiving the first display information and the second display information from the display panel, wherein the light modulation device provides a first modulating mode and a second modulating mode alternately by scanning synchronously with the display panel, wherein the first modulating mode corresponds to the first display information and renders the first display information having a first polarization state, and the second modulating mode corresponds to the second display information and renders the second display information having a second polarization state,
    wherein the light modulation device comprises a liquid crystal type light modulation device, and the liquid crystal type light modulation device comprises:
        a first transparent substrate;
        a second transparent substrate disposed opposite to the first transparent substrate;
        a modulating electrode pattern, disposed on a surface of the first transparent substrate that faces the second transparent substrate, the modulating electrode pattern comprising:
            a plurality of stripe electrodes parallel to each other, wherein the plurality of stripe electrodes comprise a plurality of transparent electrodes; and
            a plurality of auxiliary electrodes that electrically connected to each of the transparent electrodes individually, wherein each of the transparent electrodes is sandwiched between a pair of auxiliary electrodes;
        a transparent common electrode disposed on a surface of the second transparent substrate that faces the first transparent substrate;
        a first alignment film disposed on the surface of the first transparent substrate that faces the second transparent substrate;
        a second alignment film disposed on the surface of the second transparent substrate that faces the first transparent substrate; and
        a liquid crystal layer disposed between the first alignment film of the first transparent substrate and the second alignment film of the second transparent substrate.

2. The stereoscopic display device of claim 1, wherein the first polarization state and the second polarization state are orthogonal.

3. The stereoscopic display device of claim 1, further comprising a pair of polarizer glasses which includes a first polarization lens and a second polarization lens, wherein the first polarization lens allows transmission of the first display information in the first polarization state and blocks transmission of the second display information in the second polarization state, and the second polarization lens allows transmission of the second display information in the second polarization state and blocks transmission of the first display information in the first polarization state.

4. The stereoscopic display device of claim 1, wherein the first modulating mode comprises a one-half wavelength retardation mode, and the second modulating mode comprises a zero wavelength retardation mode.

5. The stereoscopic display device of claim 4, wherein the first polarization state comprises a first linear polarization state, the second polarization state comprises a second linear polarization state, and the first linear polarization state and the second linear polarization state are orthogonal.

6. The stereoscopic display device of claim 4, wherein the light modulation device further comprises a one-quarter wavelength retardation film.

7. The stereoscopic display device of claim 6, wherein the first polarization state comprises a first circular polarization state, the second polarization state comprises a second circular polarization state, and the first circular polarization state and the second circular polarization state are orthogonal.

8. The stereoscopic display device of claim 1, wherein the first transparent substrate and the second transparent substrate comprise thin film material.

9. The stereoscopic display device of claim 1, wherein the liquid crystal layer comprises twisted nematic liquid crystal molecules.

10. The stereoscopic display device of claim 1, wherein the one-half wavelength retardation mode is accomplished when the corresponding liquid crystal layer is driven by the plurality of stripe electrodes.

11. The stereoscopic display device of claim 1, wherein the zero wavelength retardation mode is accomplished when the corresponding liquid crystal layer is not driven by the plurality of stripe electrodes.

12. The stereoscopic display device of claim 1, wherein the display panel comprises an LCD panel.

13. The stereoscopic display device of claim 12, further comprising a backlight module disposed on a side of the liquid crystal display panel opposite the light modulation device.

14. The stereoscopic display device of claim 13, wherein the backlight module comprises a permanently-on backlight module.

15. The stereoscopic display device of claim 13, wherein the backlight module comprises a scanning backlight module.

16. The stereoscopic display device of claim 1, wherein a position of the first modulating mode and a position of the second modulating mode are non-fixed positions.

17. The stereoscopic display device of claim 16, wherein the position of the first modulating mode corresponds to a position of the first display information and the position of the second modulating mode corresponds to a position of the second display information.

18. The stereoscopic display device of claim 1, wherein the auxiliary electrodes are metal electrodes.

* * * * *